United States Patent
Viswanathan et al.

(10) Patent No.: US 9,001,712 B2
(45) Date of Patent: Apr. 7, 2015

(54) TRANSMIT SIGNAL CANCELATION APPARATUS AND METHODS

(71) Applicant: Texas Instruments Incorporated, Dallas, TX (US)

(72) Inventors: Nagarajan Viswanathan, Bangalore (IN); Visvesvaraya Pentakota, Bangalore (IN); Robert Clair Keller, Friedrichshafen (DE); Thomas Neu, Parker, TX (US); Francesco Dantoni, Rome (IT)

(73) Assignee: Texas Instruments Incorporated, Dallas, TX (US)

( * ) Notice: Subject to any disclaimer, the term of this patent is extended or adjusted under 35 U.S.C. 154(b) by 159 days.

(21) Appl. No.: 13/872,093

(22) Filed: Apr. 27, 2013

(65) Prior Publication Data

US 2013/0294295 A1 Nov. 7, 2013

Related U.S. Application Data

(60) Provisional application No. 61/641,634, filed on May 2, 2012.

(51) Int. Cl.
*H04B 1/52* (2006.01)
*H04L 5/14* (2006.01)

(52) U.S. Cl.
CPC .............. *H04L 5/1461* (2013.01); *H04B 1/525* (2013.01)

(58) Field of Classification Search
USPC ........................................................ 370/290
See application file for complete search history.

(56) References Cited

U.S. PATENT DOCUMENTS

| 4,660,042 A | 4/1987 | Ekstrom | |
|---|---|---|---|
| 2008/0232268 A1* | 9/2008 | Kahrizi et al. | ................. 370/252 |
| 2014/0194071 A1* | 7/2014 | Wyville | .......................... 455/73 |

FOREIGN PATENT DOCUMENTS

WO WO 2013/095386 A1 * 6/2013 ............. H04B 15/02

* cited by examiner

*Primary Examiner* — Hoon J Chung
(74) *Attorney, Agent, or Firm* — Alan A. R. Cooper; Frank D. Cimino

(57) ABSTRACT

Apparatus and methods disclosed herein implement an RF receive-band filter at a receive chain input of a wireless base station with a co-located transmitter and receiver. The RF receive-band filter includes an adaptive filter component to perform filtering operations on samples of a digital baseband or intermediate frequency signal x(n) from a transmit chain associated with the wireless base station. An adaptive filter transfer function is determined in real time such that samples of the baseband transmit signal x(n) are transformed into a cancellation baseband signal z(n). The digital cancelation baseband signal z(n) is then digital-to-analog converted and the resulting analog baseband signal z(t) is up-converted to obtain a subtractive RF cancelation signal c(t). C(t) is summed with a desirable received signal RF component r(t) and an undesirable transmitter leakage RF signal component l(t) appearing at the input to the base station receiver. C(t) cancels l(t), leaving r(t) to be processed by the receiver section of the base station.

20 Claims, 6 Drawing Sheets

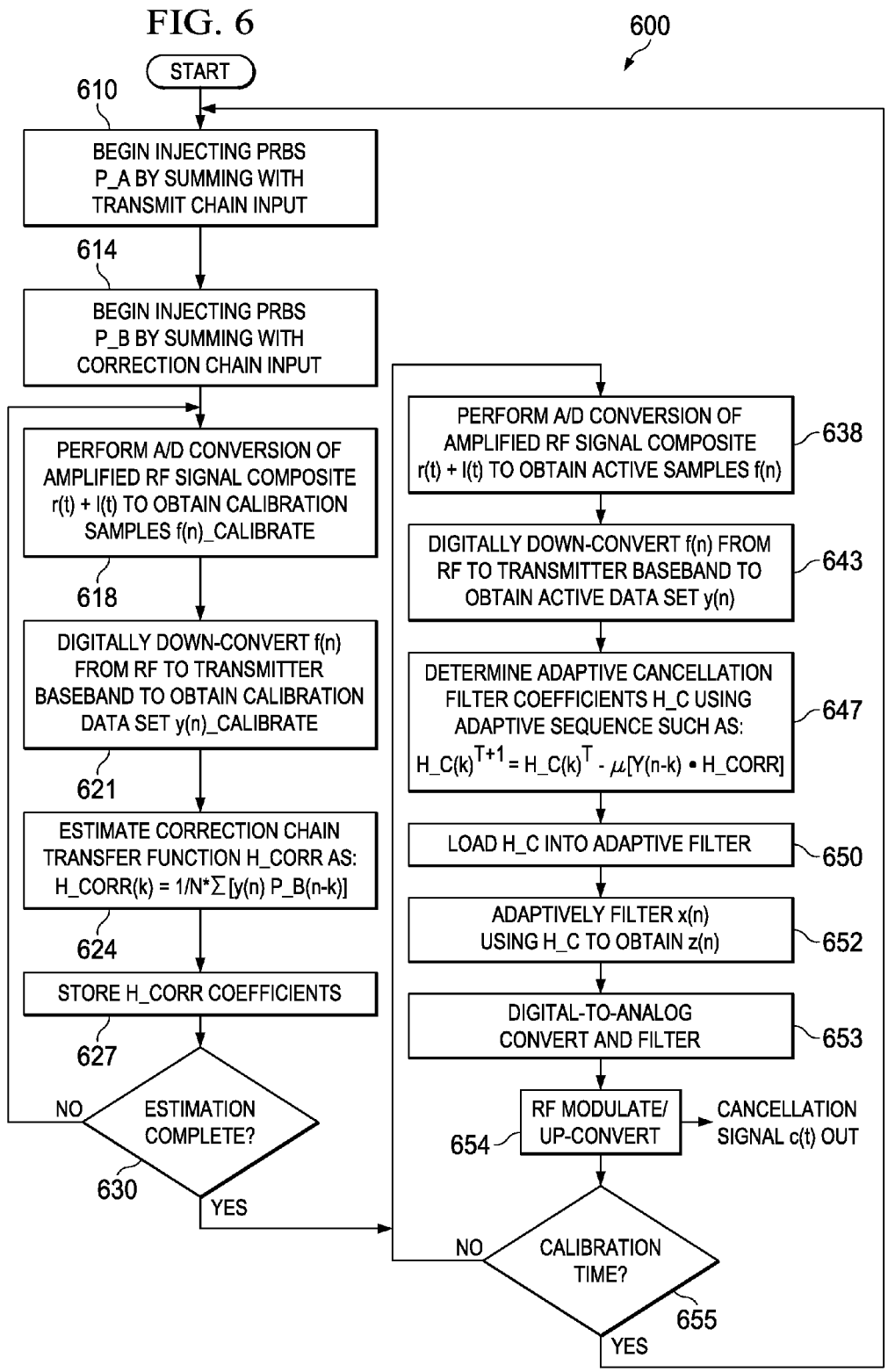

TRANSMIT SIGNAL CANCELATION APPARATUS AND METHODS

PRIORITY CLAIM

This application claims the benefit of priority under 35 U.S.C. §119(e) to U.S. Provisional Patent Application Ser. No. 61/641,634 titled "RECEIVER PRE-DISTORTION CIRCUIT" filed on May 2, 2012 and incorporated herein by reference in its entirety.

TECHNICAL FIELD

Structures and methods described herein relate to wireless communication technologies, including canceling a transmit signal component leaked into a receive chain front-end.

BACKGROUND INFORMATION

FIG. 1 is a prior-art block diagram of a wireless base station 100. The wireless base station 100 is typical of those used in cellular telephone and data distribution systems. Such base stations typically employ large, expensive antenna arrays 120 capable of directing the beam path to fill a desired area of coverage. Consequently, the antenna array 120 is typically shared between a base station transmit chain 130 and a receive chain 140. The radio frequency (RF) output signal from the transmit chain 130 traverses a duplexer 150 to arrive at and be radiated from the antenna array 120. Received signal RF arriving at the antenna array 120 is routed by the duplexer 150 to the receive chain 140.

The transmit and receive chains of modern wireless base stations operate on different frequency channels. The duplexer 150 passes RF energy from the transmit chain 130 to the antenna array 120 and simultaneously passes received RF energy from the antenna 120 to the receive chain 140. Theoretically, the duplexer 150 does but does not pass transmit RF energy to the receive chain 140. In practice, however, the duplexer rejection requirement is quite high due to a dynamic range between the transmitter output power and receiver sensitivity that can typically exceed 150 dB. Duplexers currently employ expensive, bulky, high-order filters in order to meet these stringent rejection requirements. Relaxing the rejection requirement at the duplexer 150 imposes correspondingly high linearity requirements on the receiver front-end, including on the low-noise amplifier (LNA) 160.

BRIEF DESCRIPTION OF THE DRAWINGS

FIG. 6 is a flow diagram of a method of canceling a transmitter leakage signal component received at a wireless base station receiver input according to various example embodiments.

SUMMARY OF THE INVENTION

Apparatus and methods disclosed herein implement an RF receive-band filter at a receive chain input of a wireless base station. The wireless base station is of a type with a co-located transmitter and receiver such as are employed for cellular system towers and other wireless data distribution systems. "Chain" as used herein means a set of logic blocks through which a digital and/or analog signal flows and is modified. The RF receive-band filter receives and processes a digital baseband signal from a base station transmit chain to create a subtractive RF cancellation signal c(t). C(t) is summed with an undesirable transmitter leakage signal RF component l(t) appearing at the receiver input. The RF receive-band filter performs RF filtering operations by combining the subtractive cancelation signal c(t) with l(t). Doing so cancels some or all of l(t), leaving r(t) to be processed by the receiver section of the base station.

The RF receive-band filter includes an adaptive filter component. The adaptive filter component performs filtering operations on samples of a digital baseband or intermediate frequency (IF) signal x(n) that is to be subsequently up-converted and transmitted in a transmit chain. An adaptive filter transfer function is determined in real time such that samples of the baseband transmit signal x(n) are transformed into a cancelation baseband signal z(n). The digital cancelation baseband signal z(n) is then digital-to-analog converted and the resulting analog baseband signal z(t) is up-converted to obtain the cancelation RF signal c(t).

The RF receive-band filter determines the adaptive filter transfer function by estimating the transfer function H_CORR of the digital-to-analog conversion and up conversion functions used to transform z(n) to c(t). An adaptation sequence is then performed on amplified, analog-to-digitally converted, and down-converted samples of [r(t)+l(t)−c(t)] to determine the adaptive filter coefficients H_C(k).

DETAILED DESCRIPTION

Figure 1:
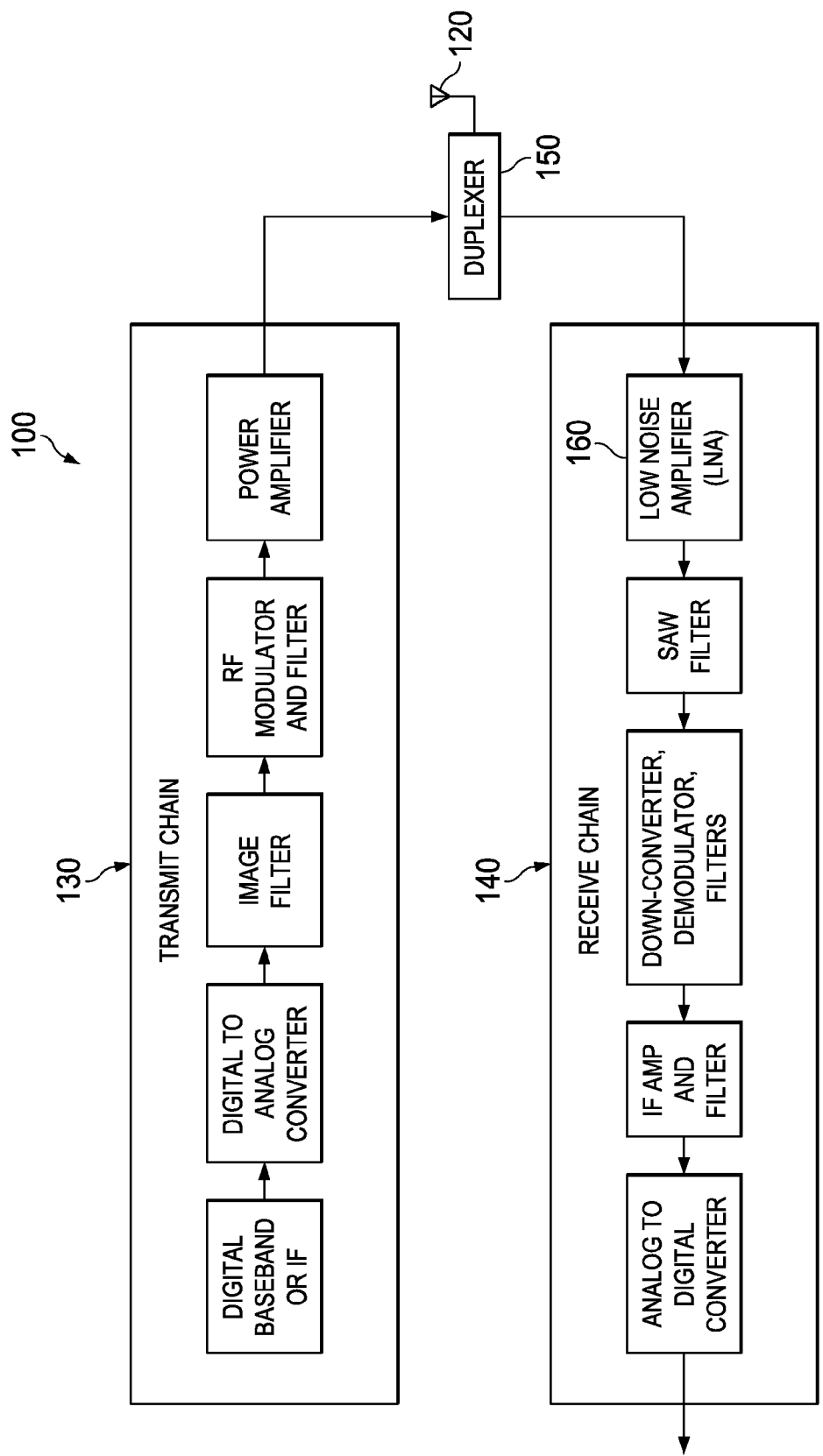
FIG. 1 is a prior-art block diagram of a wireless base station.
Figure 2:
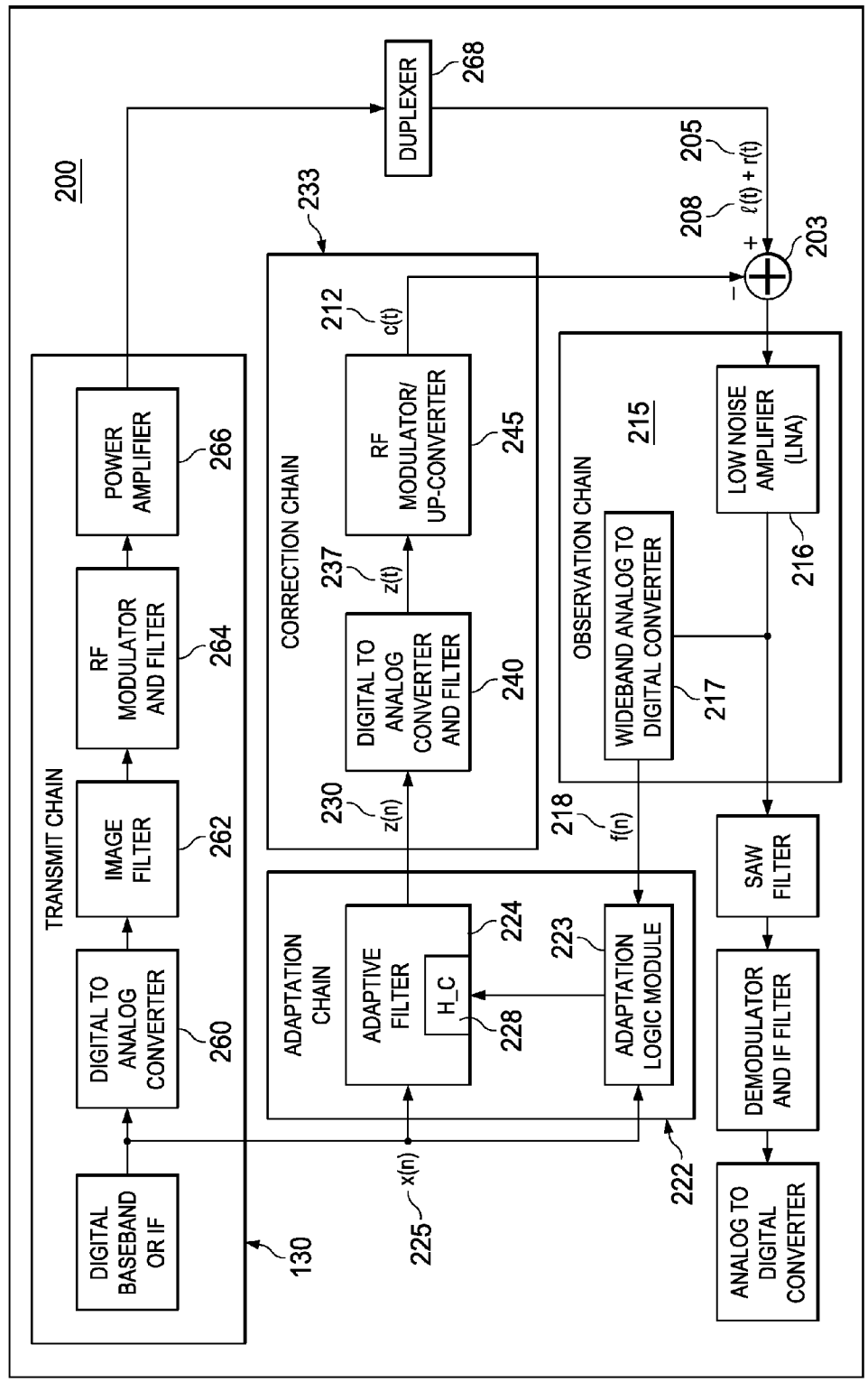
FIG. 2 is a block diagram of a transmitter leakage signal-canceling wireless base station according to various example embodiments of the invention.

FIG. 2 is a block diagram of a transmitter leakage signal-canceling wireless base station 200 according to various example embodiments of the invention. The wireless base station 200 includes an RF receive-band filter adapted to cancel a transmitter leakage signal component received at the base station receiver input.

The RF receive-band filter includes an RF signal summing module 203. The summing module 203 filters some or all of a transmitter leakage signal component l(t) 208 from a received RF sum [r(t)+l(t)]. R(t) 205 is a signal component carried on a receive channel (also referred to herein as a "desirable" received signal component). L(t) 208 is the transmitter leakage signal component l(t) 208. L(t) is carried on a transmit channel but may be of sufficient magnitude to clip in the receiver front-end and bleed over to receive channels. The RF signal summing module 203 filters the received RF by summing l(t) with a subtractive correction signal component c(t). The summing operation cancels some or all of l(t) and thereby reduce noise produced in a receive frequency band. C(t) 212 is generated by the RF receive-band filter using structures and methods disclosed in greater detail below.

The RF receive-band filter also includes an observation chain 215 coupled to the RF signal summing module 203. The observation chain 215 receives a composite RF signal sum including the desirable received signal component r(t) 205, the transmitter leakage signal component l(t) 208, and the subtractive transmitter leakage correction signal component c(t) 212. The observation chain 215 amplifies and converts the time domain sum of [r(t)+l(t)−c(t)] to a digital domain data set f(n) 218.

The observation chain 215 includes a low noise amplifier (LNA) 216 communicatively coupled to the RF summing module 203. The LNA 216 amplifies the RF signal sum [r(t)+l(t)−c(t)]. The observation chain 215 also includes a wideband analog-to-digital converter (ADC) 217 communicatively coupled to the LNA 216. The ADC 217 converts the amplified RF signal sum [r(t)+l(t)−c(t)] to the digital domain data set f(n) 218.

The RF receive-band filter also includes an adaptation chain 222 communicatively coupled to the observation chain 208. The adaptation chain 222 receives a digital baseband data set x(n) 225 from a transmit chain 130 generating the transmitter leakage component l(t) 208. The adaptation chain 222 digitally down-converts and filters the received component dataset f(n) 218 to a baseband frequency associated with x(n) 225. A down-converted, digital domain representation of the received signal components y(n) results. The adaptation chain 222 also generates a set of adaptive cancelation filter coefficients H_C 228. The adaptation chain 222 filters x(n) 225 using H_C 228 to obtain a cancelation data set z(n) 230. In some embodiments, a storage register may be communicatively coupled to the adaptation logic module 223. The storage register stores the adaptive cancelation filter coefficients H_C.

The adaptation chain 222 includes an adaptation logic module 223 communicatively coupled to the observation chain 215. The adaptation logic module 223 receives the digital baseband data set x(n) 225 from the transmit chain 130. The adaptation logic module 223 digitally down-converts and filters f(n) 218 to a baseband frequency associated with x(n) 225 to obtain y(n). The adaptation module 223 also generates the set of adaptive cancelation filter coefficients H_C 228.

The adaptation chain 222 also includes an adaptive filter 224 communicatively coupled to the adaptation logic module 223. The adaptive filter 224 receives filter coefficients H_C 228 from the adaptation logic module 223 and filters x(n) 225 using H_C 228 to obtain the cancelation data set z(n) 230.

The RF receive-band filter also includes a correction chain 233 communicatively coupled to the adaptation logic chain 222 and to the summing module 203. The correction chain 233 performs digital-to-analog conversion and filtering operations on z(n) 230 to obtain z(t) 237. The correction logic chain 233 also performs modulation and up-conversion operations to up-convert z(t) 237 to obtain the RF subtractive correction signal component c(t) 212.

The correction chain 233 includes a digital-to-analog converter (DAC) and filter 240 communicatively coupled to the adaptive filter 224. The DAC and filter 240 perform digital-to-analog conversion and filtering operations on z(n) 230 to obtain z(t) 237. The correction chain 233 also includes an RF modulator and up-converter 245 communicatively coupled to the DAC and filter 240. The RF modulator and up-converter 245 up-converts z(t) 237.

In some embodiments, the correction chain 233 may also include a saw filter (not shown) communicatively coupled to the RF modulator and up-converter 245. The saw filter filters noise created in the DAC and filter 240, the RF modulator and up-converter 245, or both. The subtractive correction RF signal component c(t) is obtained at the output of the saw filter.

The transmitter leakage signal-canceling wireless base station 200 also includes a transmit chain 130 communicatively coupled to the adaptation chain 222, as previously mentioned. The transmit chain 130 creates the digital baseband data set x(n) 225, converts x(n) 225 to an analog signal, and filters, up-converts, and amplifies the analog signal to create an analog transmit signal. The transmitter leakage component l(t) is an attenuated and filtered version of the analog transmit signal appearing at the receive chain input. In some embodiments, the transmitter leakage signal-canceling wireless base station 200 may includes a saw filter module (not shown) coupled at the input of the power amplifier 266 in the transmit chain 130. The saw filter reduces wideband noise capable of being coupled into the receive chain and may be helpful in meeting an acceptable receiver noise budget in conjunction with a duplexer having reduced filtering capacity.

The transmitter leakage signal-canceling wireless base station 200 also includes a duplexer 268 coupled to the transmit chain 130. The duplexer 268 provides a transmit chain to antenna path and an antenna to receive chain path. The duplexer 268 also provides filtering to help isolate the transmit signal from the receive signal path. The RF receive-band filter may reduce the requirement for expensive filtering devices associated with the base station duplexer.

Figure 3:
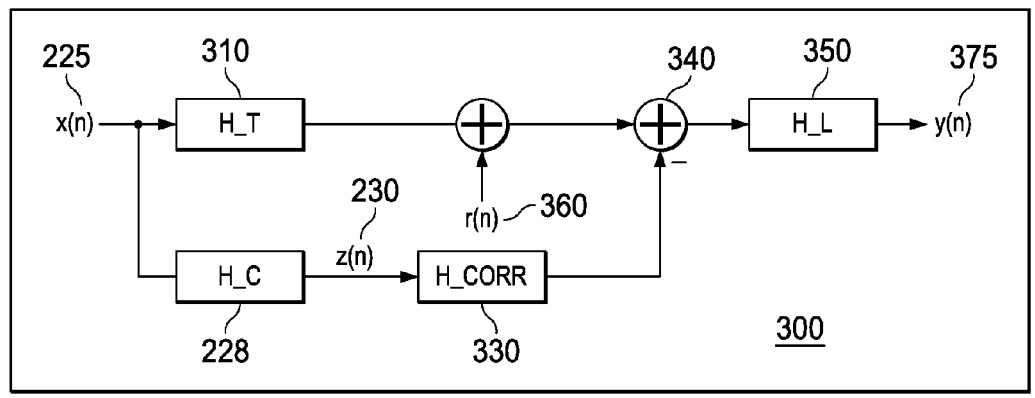
FIG. 3 is a transfer function equivalent circuit of a transmitter leakage signal-canceling wireless base station according to various example embodiments.

FIG. 3 is a transfer function equivalent circuit 300 of the transmitter leakage signal-canceling wireless base station 200 according to various example embodiments. Considering now FIG. 3 in light of FIG. 2, the digital baseband signal to be transmitted x(n) 225 appears at the inputs of transmitter transfer function block H_T 310 and adaptive cancellation filter transfer function block H_C 228. Transfer function H_T 310 is defined as the cascaded transfer function of the transmit chain DAC 260, image filter 262, RF modulator and filter 264, saw filter (not shown), power amplifier 266, duplexer 268, and the additive arm of the summing module 203. Transfer function H_C 228 is defined as a current set of filter coefficients adapted to transform x(n) 225 into a digital baseband signal which, after digital-to-analog conversion and RF modulation/up-conversion within the correction chain 233, results in the cancelation RF signal component c(t) 212 and cancelation of the transmitter leakage signal component l(t) 208.

The transmit digital baseband signal x(n) 225 is transformed by block H_C 228 to z(n) 230. Z(n) 230 is transformed by correction path transfer function H_CORR 330. H_CORR 330 is defined as the cascaded transfer function of the correction DAC and filter 240, the RF modulator/up-converter 245, and the subtractive arm of the algebraic summing module 203.

The output of H_CORR 330 is subtracted from the output of H_T 310 at the algebraic summing junction 340. The resulting output of the summing junction 340 undergoes transformation by the observation chain transfer function block H_L 350. H_L 350 is defined as the transfer function of the LNA 216 and the wideband RF ADC 217. The output of block H_L 350 is summed with the digitized and down-converted desired received signal r(n) 360 to produce the digitized and down-converted version y(n) 375 of the composite received RF signal [r(t)+l(t)−c(t)]. It is noted that y(n) 375 is received by the adaptation logic module 223 as f(n) 218 and is used in the adaptive determination of H_C 228. As such, y(n) exists as a digital signal within the adaptation logic module 223.

A transfer function equation can be created from the transfer function block diagram 300 as follows:

$$y(n) = [x(n)(+)\{H\_T - H\_C(+)H\_CORR\}](+)H\_L + r(n),$$

where the symbol (+) denotes a convolution operation. It is desirable that the digitized, filtered, and down-converted version y(n) 375 of the received RF component sum [r(t)+l(t)−c (t)] have all terms equal to zero except r(n), the desired received signal. Such a condition can be obtained by setting the quantity within braces {H_T−H_C (+) H_CORR} equal to zero. In that case:

$$H\_T = H\_C(+)H\_CORR$$

and the leaked transmitted signal is canceled.

Figure 4:
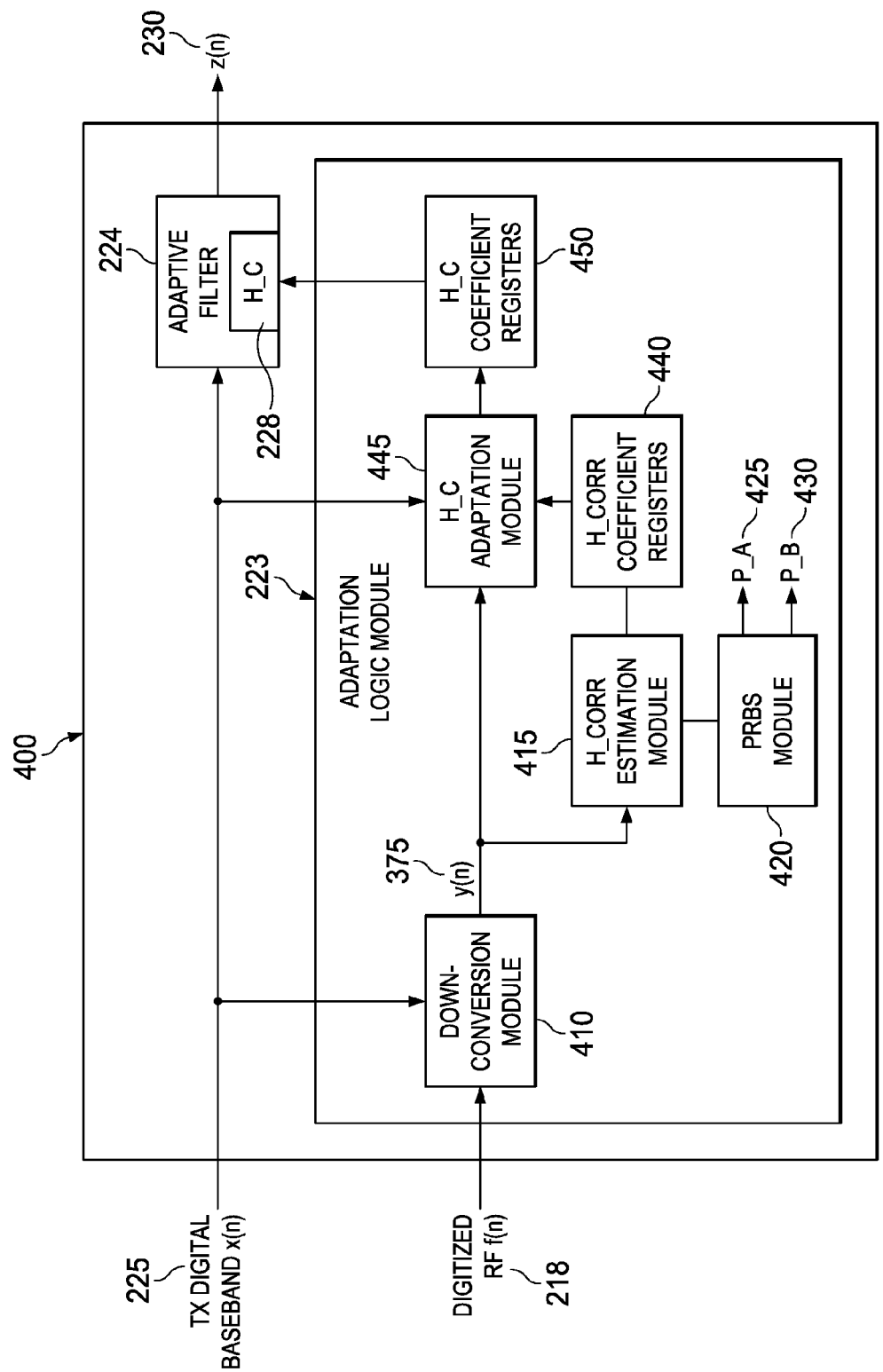
FIG. 4 is a block diagram of an adaptive filtering apparatus according to various example embodiments.

FIG. 4 is a block diagram of an adaptive filtering apparatus 400 according to various example embodiments. The adaptive filtering apparatus 400 creates a set of adaptive filter coefficients H_C 228, loads the coefficients H_C 228 into adaptive filter 224, and filters the transmit digital baseband signal x(n) 225 to create the digital baseband cancellation signal z(n) 230.

The adaptive filtering apparatus 400 includes a down-conversion module 410. The down-conversion module 410 receives the digitized RF signal f(n) 218 and down-converts and filters f(n) 218 to produce a baseband received signal y(n) 375. F(n) 218 includes the digitized received signal component r(t) 205, the digitized transmitter leakage signal component l(t) 208, and the subtractive RF correction signal component c(t) 212, as previously mentioned.

The adaptive filtering apparatus 400 also includes an H_CORR estimation module 415 communicatively coupled to the down-conversion module 410 and a pseudorandom bit sequence (PRBS) module 420 communicatively coupled to the H_CORR estimation module 415. H_CORR is the transfer function corresponding to the functions of digital-to-analog conversion and up-conversion of z(n) 230 to obtain the RF correction signal component c(t) 212.

The PRBS module 420 generates a first PRBS P_A 425 and a second PRBS P_B 430. P_A 425 is injected into the transmit chain 130 for summing with the digital baseband transmit signal x(n) 225 and P_B 430 is summed with the digital baseband cancelation signal z(n) 230.

Figure 5:
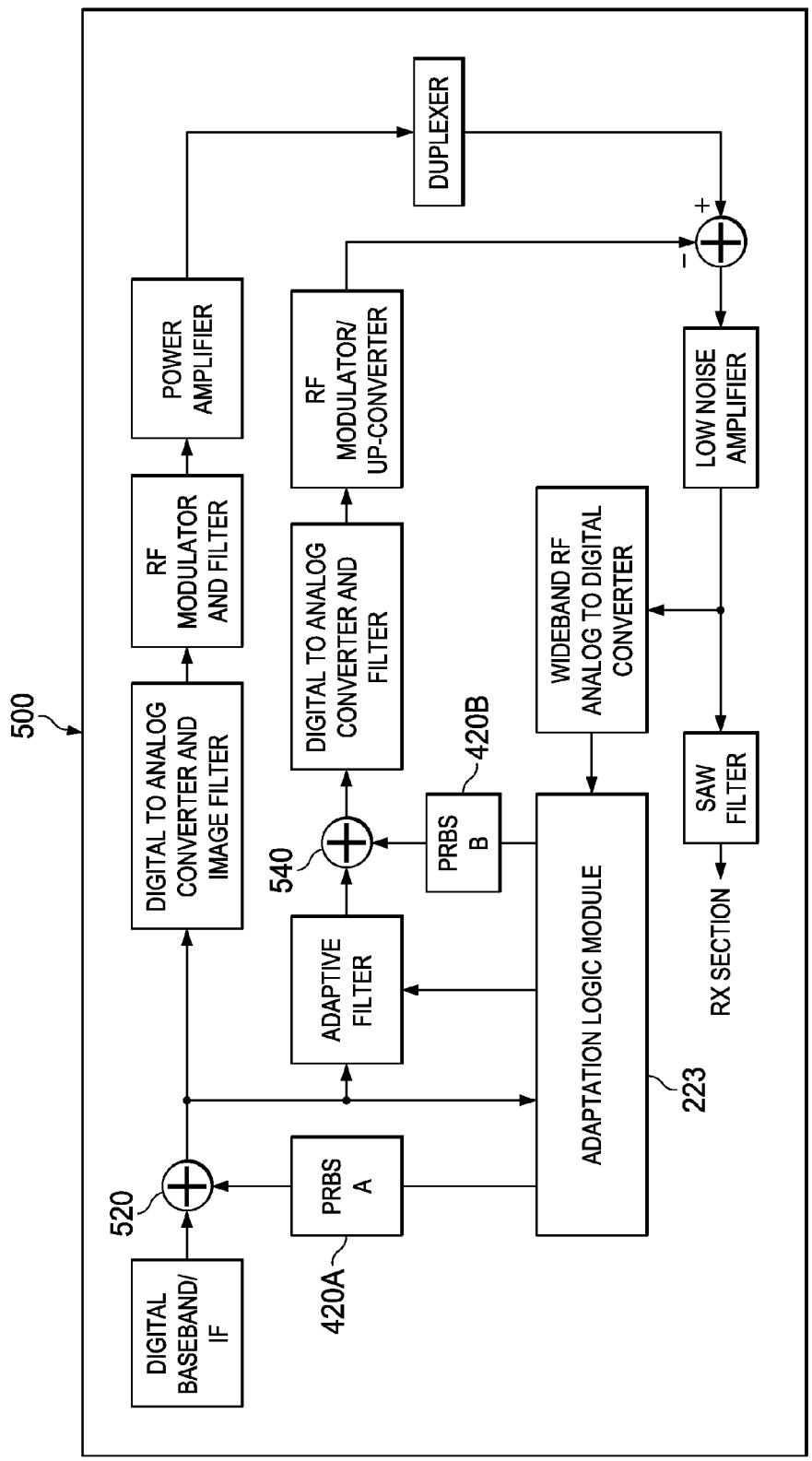
FIG. 5 is a block diagram of a transmitter leakage signal-canceling wireless base station showing pseudorandom bit sequence injection points according to various example embodiments.

FIG. 5 is a block diagram of a transmitter leakage signal-canceling wireless base station 500 showing PRBS injection points according to various example embodiments. In the case of a frequency-hopped transmit system, the transmit frequency is hopped periodically over a multi-channel bandwidth. In that case, some embodiments may include a PRBS module section 420A coupled to the adaptation logic module 223. The PRBS module section 420A injects a wideband bit sequence P_A 425 into the transmit chain 130 at the summing junction 520. Doing so adds P_A 425 to x(n) 225 in order to estimate the transmit chain transfer function over a multi-channel band of operation.

Some embodiments may also include PRBS module section 420B coupled to the adaptation logic module 223. PRBS 420B injects P_B into a summing junction 540 to be summed with adaptive filter output z(n) 230. The adaptation logic module 223 estimates the coefficients of the correction chain transfer function H_CORR(k) by observing the correlation of P_B to the output y(n) 375.

Turning back to FIG. 4, the correction chain transfer function estimation module H_CORR 415 initiates a P_B operation and generates a set of estimated correction chain transfer function coefficients H_CORR(k) as:

$$H\_CORR(k) = \frac{1}{N} \sum_{n=\text{start of block}}^{N} y(n) P\_B(n-k),$$

where N is equal to a number of samples of y(n) in a selected calibration data block, y(0) is the first value of y in the calibration data block, and k is the index of the correction chain transfer function coefficient matrix H_CORR.

It is noted that it may be desirable to re-estimate H_CORR periodically or even continuously to account for variations over time and temperature in components of the DAC and filter 240 and of the RF modulator/up-converter 245 of the correction chain 233. In some embodiments, H_CORR coefficients may be stored in an H_CORR coefficient register 440.

The adaptive filtering apparatus 400 also includes a cancelation chain transfer function adaptation module H_C 445 communicatively coupled to the down-conversion module 410. The module H_C 445 iteratively generates a set of adaptive filter coefficients using an iterative adaptation sequence such as:

$$H\_C(k)^{T+1} = H\_C(k)^T - \mu[Y(n-k).H\_CORR],$$

where Y(n−k) is a row matrix with K elements as [y(n−k), y(n−k−1), y(n−k−2) ... y(n−k−K+1)] and H_CORR is a column matrix with K elements as [H_CORR(0), H_CORR (1) ... H_CORR(K)]. In some embodiments, [Y(n−k). H_CORR] may be computed for every y(n) sample in a calibration data block. Alternatively, in some embodiments [Y(n−k). H_CORR] may be computed for a block of samples, with H_C updated at the end of each block.

It is noted that some embodiments may use various adaptation sequences including least mean squares and least squares, for example. Some embodiments of the adaptive filtering apparatus 400 may store the H_C coefficients 228 in H_C coefficient registers 450 communicatively coupled to the H_C adaptation module 445.

The adaptive filtering apparatus 400 also includes an adaptive filter 224 communicatively coupled to the H_C adaptation module 445. The adaptive filter 224 loads the set of adaptive filter coefficients 228 and filters x(n) 225 to obtain the digital baseband cancelation signal z(n) 230.

FIG. 6 is a flow diagram illustrating a method 600 of canceling a transmitter leakage signal component received at a wireless base station receiver input according to various example embodiments. In some embodiments, the method 600 may incorporate a calibration sequence to estimate a correction chain transfer function H_CORR, as previously described. The calibration sequence includes generating a first PRBS P_A and a second PRBS P_B.

The method 600 may commence at block 610 with injecting P_A into the transmit chain by summing with a digital baseband transmit signal x(n). Transmit chain operations include creating the digital baseband data set x(n), converting x(n) to an analog signal, and filtering, up-converting, and amplifying the analog signal to create an analog transmit signal. The transmitted leakage component l(t) may also include signals coupled from the transmitter to the receiver due to close proximity of the transmit and receive chains in the wireless base station.

The method 600 also includes summing P_B with a correction chain input signal z(n), at block 614. The method 600 further includes algebraically summing a desirable received signal component r(t), a transmitter leakage signal component l(t), and a subtractive correction signal component c(t) to obtain an RF signal sum. The method 600 also includes receiving the RF signal sum at a base station receive chain input. During calibration, c(t) includes a PRBS B component. The method 600 includes amplifying and digitizing the RF signal sum to obtain a digital domain calibration data set f(n)_CALIBRATE, at block 618.

The method 600 continues with receiving samples of the digital baseband transmit signal x(n) from the transmit chain at an adaptation chain as previously described. The method 600 also includes down-converting and filtering f(n) to a baseband frequency associated with x(n) to obtain y(n)_CALIBRATE, at block 621.

The method 600 also includes estimating a correction chain transfer function H_CORR as $1/N*\Sigma[y(n)\_CALIBRATE*P\_B(n-k)]$, at block 624. The method 600 further includes storing H_CORR coefficients H_CORR(k), at block 627. The method 600 also includes determining whether the estimation of H_CORR is complete, at block 630. If not, the method 600 includes performing additional H_CORR estimation operations on additional blocks of f(n) beginning at block 618.

Following calibration to estimate the correction chain transfer function H_CORR, the method 600 continues with receiving additional blocks of the RF signal sum [r(t)+l(t)−c(t)]. The method 600 includes amplifying and converting the RF signal sum to obtain a run-time digital domain data set f(n), at block 638. The method 600 also includes receiving the digital baseband data set x(n) from the transmit chain at the adaptation chain and down-converting and filtering f(n) to a baseband frequency associated with x(n) to obtain run-time data y(n), at block 643.

The method 600 continues at block 647 with generating a set of adaptive cancellation filter coefficients H_C using an appropriate iterative adaptation sequence. The adaptation sequence may be of a least mean squares or least squares type, for example. One such adaptation sequence is:

$$H\_C(k)^{T+1} = H\_C(k)^T - \mu[Y(n-k).H\_CORR],$$

as previously described in detail.

The method 600 may also include loading H_C coefficients into an adaptive filter, at block 650 and filtering x(n) using H_C to obtain a cancellation data set z(n), at block 652. The method 600 may further include performing digital-to-analog conversion and filtering operations on z(n) to obtain z(t), at block 653, and up-converting z(t) to obtain the subtractive correction RF signal component c(t), at block 654. The method 600 may periodically determine whether additional calibration operations to estimate H_CORR are desired, at block 655. It is noted that in some embodiments, H_CORR may be continuously estimated.

Modules and components described herein may include hardware circuitry, optical components, single or multi-processor circuits, and/or memory circuits. Subject matter of the instant disclosure may also include combinations of described modules and components, as desired by the architects of the noise cancelation apparatus 200, 400, and 500, the method 600, and as appropriate for particular implementations of various embodiments.

Apparatus and methods described herein may be useful in applications other than implementation of a transmit noise-canceled wireless base station. Examples of the noise cancelation apparatus 200, 400, 500 and the method 600 are intended to provide a general understanding of the structures of various embodiments and the flow of various sequences. They are not intended to serve as complete descriptions of all elements and features of apparatus and systems that might make use of these structures and sequences.

The various embodiments may be incorporated into semiconductor analog and digital circuits for use in receptacle power converters, electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players, vehicles, medical devices (e.g., heart monitor, blood pressure monitor, etc.), set top boxes, and others.

Apparatus and methods disclosed herein implement an RF receive-band filter at a receive chain input of a wireless base station with a co-located transmitter and receiver. The RF receive-band filter accesses and process digital baseband signal samples from a wireless base station transmitter to create a subtractive RF cancelation signal c(t). The RF receive-band filter performs RF filtering operations by summing c(t) with an undesirable transmitter leakage signal RF component l(t) appearing at the input to the base station receiver. Doing so cancels some or all of l(t), leaving r(t) to be processed by the receiver section of the base station. The invented apparatus and methods may reduce the requirement for expensive filtering devices associated with the base station duplexer.

By way of illustration and not of limitation, the accompanying figures show specific aspects in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The aspects illustrated are described in sufficient detail to enable those skilled in the art to practice the teachings disclosed herein. Other aspects may be used and derived therefrom, such that structural and logical substitutions and changes may be made without departing from the scope of this disclosure. This Detailed Description, therefore, is not to be taken in a limiting sense. The breadth of various aspects is defined by the appended claims and the full range of equivalents to which such claims are entitled.

Such aspects of the inventive subject matter may be referred to herein individually or collectively by the term "invention" merely for convenience and without intending to voluntarily limit this application to any single invention or inventive concept, if more than one is in fact disclosed. Thus, although specific aspects have been illustrated and described herein, any arrangement calculated to achieve the same purpose may be substituted for the specific aspects shown. This disclosure is intended to cover any and all adaptations or variations of various aspects.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A radio frequency (RF) receive-band filter in a wireless base station, comprising:
   an observation chain in a receive path to receive a composite RF signal sum including a received signal component r(t), a transmitter leakage signal component l(t) and a subtractive correction signal component c(t) and to amplify and convert the time domain sum of [r(t)+l(t)−c(t)] to a digital domain data set f(n);

an adaptation chain communicatively coupled to the observation chain to receive a digital baseband data set x(n) from a transmitter generating the transmitter leakage component l(t), to digitally down-convert and filter f(n) to a baseband frequency associated with x(n) to obtain y(n), to generate a set of adaptive cancelation filter coefficients H_C, and to filter x(n) using H_C to obtain a cancelation data set z(n); and a correction chain communicatively coupled to the adaptation chain to perform digital-to-analog conversion and filtering operations on z(n) to obtain z(t) and to up-convert z(t) to obtain the subtractive correction RF signal component c(t).

2. The RF receive-band filter of claim 1, further comprising:

an RF signal summing module communicatively coupled to a base station duplexer, to the correction chain, and to the observation chain to filter a received RF sum [r(t)+l(t)] by summing the subtractive correction signal component c(t) with l(t) in order to cancel at least a portion of l(t) and to thereby reduce noise produced in a receive frequency band.

3. The RF receive-band filter of claim 2, the observation chain further comprising:

a low noise amplifier (LNA) communicatively coupled to the RF summing module to amplify the RF signal sum [r(t)+l(t)−c(t)]; and a wideband analog-to-digital converter (ADC) communicatively coupled to the LNA to convert the amplified RF signal sum [r(t)+l(t)−c(t)] to the digital domain data set f(n).

4. The RF receive-band filter of claim 1, the adaptation logic chain further comprising:

an adaptation logic module communicatively coupled to the observation chain to receive the digital baseband data set x(n) from the transmit chain generating the transmitter leakage component l(t), to digitally down-convert and filter f(n) to a baseband frequency associated with x(n) to obtain y(n), and to generate the set of adaptive cancelation filter coefficients H_C; and an adaptive filter communicatively coupled to the adaptation logic module to filter x(n) using H_C to obtain the cancelation data set z(n).

5. The RF receive-band filter of claim 1, the adaptation logic chain further comprising:

a storage register communicatively coupled to the adaptation logic module to store the adaptive cancelation filter coefficients H_C.

6. The RF receive-band filter of claim 1, the correction chain further comprising:

a digital-to-analog converter (DAC) and filter communicatively coupled to the adaptation chain 222 to perform the digital-to-analog conversion and filtering operations on z(n) to obtain z(t);

an RF modulator and up-converter communicatively coupled to the DAC and filter to up-convert z(t); and a saw filter communicatively coupled to the RF modulator and up-converter to filter noise created in the DAC and filter and/or noise created in the RF modulator and up-converter and to obtain the subtractive correction RF signal component c(t).

7. The RF receive-band filter of claim 1, further comprising:

a transmit chain to create the digital baseband data set x(n), to convert x(n) to an analog signal, and to filter, up-convert, and amplify the analog signal to create an analog transmit signal, the transmitter leakage component l(t) being a portion of the analog transmit signal; and a saw filter in the transmit chain at a power amplifier input to reduce wideband noise capable of being coupled into the receive chain.

8. The RF receive-band filter of claim 1, further comprising:

a duplexer to provide a transmit chain to antenna path and an antenna to receive chain path and to provide filtering to help isolate the transmit signal from the receive signal path.

9. An adaptive filtering apparatus, comprising:

a down-conversion module to receive a digitized radio frequency (RF) signal f(n) and to down-convert and filter f(n) to produce a baseband received signal y(n), f(n) to include a digitized received signal component r(t), a digitized transmitter leakage signal component l(t), and a subtractive RF correction signal component c(t);

a pseudorandom bit sequence (PRBS) module to generate a first PRBS P_A and a second PRBS P_B, P_A to inject into a transmit chain for summing with a digital baseband transmit signal x(n) and P_B to sum with a digital baseband cancelation signal z(n);

a correction chain transfer function estimation module H_CORR communicatively coupled to the down-conversion module and to the PRBS module to initiate a P_B operation and to generate a set of estimated correction chain transfer function coefficients H_CORR(k) as $1/N^* \Sigma[y(n)\ P\_B(n-k)]$, H_CORR corresponding to digital-to-analog conversion and up-conversion of z(n) to obtain the RF correction signal component c(t);

a cancelation chain transfer function adaptation module H_C communicatively coupled to the down-conversion module to iteratively generate a set of adaptive filter coefficients using an adaptation sequence; and an adaptive filter communicatively coupled to the cancelation chain transfer function adaptation module H_C to load the set of adaptive filter coefficients and to filter x(n) to obtain the digital baseband cancelation signal z(n).

10. The adaptive filtering apparatus of claim 9, the adaptation sequence being:

$$H\_C(k)^{T+1} = H\_C(k)^T - \mu[Y(n-k).H\_CORR].$$

11. The adaptive filtering apparatus of claim 9, further comprising:

a first set of transfer function coefficient registers to store H_CORR; and a second set of transfer function coefficient registers to store H_C.

12. A method of transmitter leakage signal cancelation, comprising:

receiving a radio frequency (RF) signal sum including a desirable received signal component r(t), a transmitter leakage signal component l(t), and a subtractive correction signal component c(t) at a base station receive chain;

amplifying and digitizing the RF signal sum to obtain a digital domain data set f(n);

at an adaptation chain, receiving a digital baseband data set x(n) from a transmit chain generating the transmitter leakage component l(t);

down-converting and filtering f(n) to a baseband frequency associated with x(n) to obtain y(n);

generating a set of adaptive cancellation filter coefficients H_C using an adaptation sequence operating on y(n);

filtering x(n) using H_C to obtain a cancellation data set z(n);

performing digital-to-analog conversion and filtering operations on z(n) to obtain z(t); and up-converting z(t) to obtain the subtractive correction RF signal component c(t).

13. The method of noise cancelation of claim 12, the adaptation sequence being:

$$H\_C(k)^{T+1} = H\_C(k)^T - \mu[Y(n-k).H\_CORR].$$

14. The method of noise cancelation of claim 12, further comprising:

algebraically summing r(t), l(t), and c(t) as [r(t)+l(t)−c(t)] to obtain the RF signal sum.

15. The method of transmitter leakage signal cancelation of claim 12, transmit chain operations further comprising:

creating the digital baseband data set x(n);

converting x(n) to an analog signal; and filtering, up-converting, and amplifying the analog signal to create an analog transmit signal, the transmitter leakage component l(t) including energy associated with the analog transmit signal.

16. The method of transmitter leakage signal cancelation of claim 12, further comprising:

generating a first pseudorandom bit sequence (PRBS) P_A and a second PRBS P_B;

injecting P_A into the transmit chain by summing with the digital baseband transmit signal x(n); and summing P_B with correction chain input signal z(n).

17. The method of transmitter leakage signal cancelation of claim 16, further comprising:

receiving a calibration RF signal sum including a received signal component r(t), a transmitter leakage signal component l(t), and a subtractive correction signal component c(t) at a base station receive chain input, c(t) to include a PRBS component; and amplifying and digitizing the calibration RF signal sum to obtain a digital domain calibration data set f(n)_CALIBRATE.

18. The method of transmitter leakage signal cancelation of claim 17, further comprising:

at an adaptation chain, receiving a digital baseband data set x(n) from a transmit chain generating the transmitter leakage component l(t); and down-converting and filtering f(n) to a baseband frequency associated with x(n) to obtain y(n)_CALIBRATE.

19. The method of transmitter leakage signal cancelation of claim 18, further comprising:

estimating a correction chain transfer function H_CORR as $1/N*\Sigma[y(n)\_CALIBRATE*P\_B(n-k)]$; and storing H_CORR coefficients H_CORR(k).

20. The method of transmitter leakage signal cancelation of claim 19, further comprising:

determining whether the estimation of H_CORR is complete; and performing additional H_CORR estimation operations on additional blocks of f(n) if the estimation of H_CORR is not complete.

\* \* \* \* \*